Patented June 8, 1948

2,443,169

UNITED STATES PATENT OFFICE 2,443,169

FLUID GALVANIZING BLANKET

Dunbar L. Shanklin, Winchester, Mass., assignor to Dewey and Almy Chemical Company, North Cambridge, Mass., a corporation of Massachusetts No Drawing. Application February 1, 1947, Serial No. 725,975

6 Claims. (Cl. 148—26)

The present application is a continuation-in-part of Serial No. 428,629, filed January 28, 1942, now abandoned.

The large open surface of a galvanizing kettle allows such rapid oxidation of the melted zinc that it is necessary to shut off as much air as possible from reaching the melted surface. A solid cover is not practical when large shapes and pipes must be fed into the zinc. Consequently, it is customary to protect the molten zinc surface with a floating blanket of some loose or powdery material, such, for instance, as granulated charcoal, saw dust, leather scrap, exfoliated vermiculite, etc., which reduces the oxidation of the metal and also reduces the loss of heat from the metal surface, but a blanket of loose material permits some air to reach the surface of the zinc, interferes with feeding wire into the kettle and is extremely inconvenient whenever the kettle must be drossed.

To avoid the troubles which loose solid matter inherently causes, at least one attempt has been made to produce a liquid blanket, but, for reasons which will be explained, the composition has not been used commercially to any substantial extent. That blanket is composed of sodium chloride, potassium chloride and zinc chloride with or without magnesium chloride. Although the ingredients are in proper proportion to form a eutectic below the melting point of zinc, the separate ingredients do not fuse properly while floating on melted zinc. Therefore, as a practical matter, it was found necessary to fuse the ingredients separately, usually at about 1000° F., allow the fused mixture to cool, and then grind the resultant mass before application to the bath. This procedure had to be performed either by the manufacturer of the crystals, in which case it increased the expense, or by the galvanizer, in which case it required equipment with which the galvanizer was not ordinarily provided. In either case, a substantial item of expense was incurred.

In the second place, such a blanket gave off hydrochloric acid fumes which are a serious menace to the health of the operators and cause corrosion of metals; expensive protective measures and constant attention were required to remove them sufficiently to prevent serious injury.

In the third place, the zinc oxide, which constantly forms during the operation of the bath, accumulated in the molten blanket and gradually stiffened it. A thick blanket could be thinned (by simple dilution) by the addition of fresh crystals to it, but even then, the accumulation of zinc oxide became so great that the blanket had to be removed and a new blanket substituted in a comparatively short time. Since the blanket, when removed, contained as much as 60% of zinc, the loss was substantial even if the zinc was recovered.

I have discovered that it is possible to provide a dry, granular blanket compound which fuses quickly and completely while floating upon the melted zinc in a galvanizer's kettle so that pre-fusion and grinding is not required; which gives off alkaline (ammonia) fumes and, therefore, requires no protection of employees and machinery and which can be regenerated from time to time by the addition of small amounts of a regenerative composition which converts the zinc oxide into zinc chloride. It is zinc oxide which stiffens the blanket. Its conversion to zinc chloride, which is fluid at molten zinc temperatures, produces a blanket which can be used indefinitely, hence the loss from discarded blankets is greatly reduced.

My improved compound comprises essentially a mixture of an alkali-metal chloride (preferably potassium chloride), zinc chloride, ammonium chloride and preferably a small amount of zinc oxide, the proportions of ammonium chloride, alkali-metal chloride and zinc chloride being such as to give an initial fusion point far below that of zinc, and the proportion of alkali-metal chloride to the zinc chloride being such as to maintain the fluidity of the blanket after the partial or complete exhaustion of the ammonium chloride. Furthermore, as zinc oxide, and to some extent zinc oxychloride, accumulate in the blanket, they can be converted into additional zinc chloride by the addition of a regenerative compound which consists of the materials of the original blanket but in which the ammonium chloride is much in excess of the original proportion.

I believe that the effective melting of my composition on a zinc bath is due to a combination of the following actions:

1. The reaction of zinc oxide and ammonium chloride releases water; therefore, all salts first tend to go into water solution.

2. Even small additions of ammonium chloride to zinc chloride lower the melting point of the mixture with extreme rapidity. For example, although zinc chloride melts at 503.6° F., a mixture of zinc chloride and 16.39% of ammonium chloride melts at 450° F. If the proportion of ammonium chloride is raised to 26.65%, the melting point falls to 367° F.

3. As the temperature rises, and water boils out, the release of steam churns the whole mass thoroughly, so that fusion takes place more rapidly.

4. The zinc oxide in the compound or that formed by the zinc bath itself reacts with the ammonium chloride and produces ammonia and additional zinc chloride. Only ammonia fumes are released from the blanket.

5. The low eutectic melting point of potassium chloride and zinc chloride maintains the liquidity of the blanket. Accordingly, it is possible to maintain the fusion point of the material of which the blanket is formed below that of zinc and the subliming point of ammonium chloride.

When the compound embodying my invention is placed on the top of the molten zinc bath, it melts immediately, foaming but not sputtering as the water is given off, and then settling down to a very fluid layer. The ammonia gas given off is in small quantities and is not objectionable.

Even with a liquid blanket which seals the surface from air, there is an unavoidable formation of zinc oxide while the kettle is in operation. Pipes dropped into the bath carry in air, oxide forms beyond the exit dam. Water carried in as flux solution on the steel forms some oxide, but its main effect is to form zinc oxychloride or oxychloride-like bodies which ultimately build up as lumps in the blanket. These may be removed by straining the blanket through a wire basket skimmer. The zinc oxide, although concentrating in the blanket, remains well distributed. It cannot be removed mechanically. Consequently, as its concentration rises, the blanket stiffens until it becomes too pasty for articles to be fed into the kettle properly.

I have discovered that the blanket may be regenerated to overcome the accumulation of oxides and so used indefinitely by the addition of a second compound comprising essentially an alkali-metal chloride, (preferably potassium chloride), and ammonium chloride, with or without zinc oxide, the proportion of ammonium chloride being very much in excess of the proportion of ammonium chloride in the original blanket. Zinc chloride is also usually included in the regeneration compound, since it must be present during fusion to prevent sublimation of the ammonium chloride before fusion. However, where the metal to be coated has been fluxed with zinc chloride the amount in the blanket may be reduced or omitted altogether as explained hereinafter. This is not the mere addition of more of the original blanket forming material which, of course, would tend to increase the liquidity of the blanket because of dilution. On the contrary, the relatively large amount of ammonium chloride unites with the zinc oxide which would otherwise stiffen the blanket and converts the oxide into zinc chloride which has the opposite effect and tends to liquefy the blanket.

In the regeneration operation, the attempt should be made to maintain the concentration of alkali-metal chloride approximately in the proportions existing in the original blanket composition so that the low-fusing, eutectic mixture of zinc-chloride-alkali metal chloride will be maintained. There also should be enough zinc chloride present to form a low-fusing mixture with the ammonium chloride and so prevent the loss of ammonium chloride by sublimation. However, some fluxing practices continuously add zinc chloride to the bath in the form of flux on the steel. When sufficient zinc chloride is added in this manner, it is unnecessary to add zinc chloride as an ingredient in the regenerative composition. Zinc oxide may or may not be added. If used, its function is to prevent caking of the regenerative crystals. Zinc oxide is, of course, important to prevent the release of acid fumes, but if caking of the crystals is not a consideration, enough zinc oxide exists in the blanket itself at the time when regeneration is necessary to prevent acid from being released.

The ammonium chloride not only reacts with the zinc oxide, but with the zinc oxychloride. I have found it much better and therefore recommend that the regenerative compound be added frequently and in small quantities so that it may unite with the oxychlorides and retard the formation of lumps which ammonium chloride cannot penetrate. When the regenerative compound is added infrequently, the lumps are quite large before the next addition is made, consequently the compound is less effective in retarding the growth of the lumps.

My preferred composition for the blanket is as follows:

| | Parts by weight |
|---|---|
| Potassium chloride | 35 |
| Zinc chloride | 59.3 |
| Ammonium chloride | 4.6 |
| Zinc oxide | 1.1 |

I have included zinc oxide in the above formula because it is advantageous since it prevents caking of the crystals and prevents the production of acid fumes.

This composition begins to melt at 270° F. It increases in viscosity at 340° F. to 360° F. when the last traces of water are expelled, but is a thin liquid at 420 to 450° F. On cooling, it congeals at 400° F. The potassium chloride, it will be noticed, is in excess of that necessary to give a eutectic mixture with zinc chloride at 400° F. This affords an excess to fuse with any zinc chloride which comes into the blanket as flux on the steel. The excess has been determined by practice to be sufficient to compensate for dilution of the blanket by zinc chloride from the flux.

Another satisfactory formula for the original blanket made with zinc-ammonium chloride is as follows:

| | Parts by weight |
|---|---|
| Potassium chloride | 35. |
| Zinc ammonium chloride | 10.9 |
| Zinc chloride | 53. |
| Zinc oxide | 1.1 |

The following compositions give a wide range of adjustment and meet nearly all commercial conditions:

EXAMPLES OF ORIGINAL BLANKET COMPOSITIONS

| | I | II | III | IV | V | VI |
|---|---|---|---|---|---|---|
| NaCl | | 10.0 | | 10 | | 10 |
| KCl | 35.0 | 32.4 | 14.2 | 15.5 | 17 | 24 |
| ZnCl$_2$ | 59.3 | 51.9 | 80.1 | 59.5 | 68 | 51 |
| NH$_4$Cl | 4.6 | 4.6 | 4.6 | 10 | 10 | 10 |
| ZnO | 1.1 | 1.1 | 1.1 | 5 | 5 | 5 |
| | 100.0 | 100.0 | 100.0 | 100.0 | 100 | 100 |
| Ratio of alkali metal chloride to zinc chloride | 37:63 | 45:55 | 15:85 | 30:70 | 20:80 | 40:60 |

Both the ammonium chloride and the zinc oxide may be much in excess of the amounts already suggested—the ammonium chloride may be as much as 20 percent and the zinc oxide may be as much as 15 percent of the total composition—but the ammonium chloride should always be in excess of the zinc oxide since there should be enough to convert most of the zinc oxide into zinc chloride.

The regenerative compositions may vary and should be adjusted to the individual galvanizer's practice to allow for fluxing materials carried into the blanket.

REGENERATIVE COMPOUNDS

*Formulas (parts by weight)*

|  | A | B | C | D | E |
|---|---|---|---|---|---|
| KCl | 35.0 | 37.0 | 35.0 | 91.0 | 15.0 |
| NaCl |  |  |  |  | 9.0 |
| (NH₄Cl)₂.ZnCl₂ | 31.8 | 60.0 |  |  |  |
| ZnCl₂ | 30.0 |  |  |  | 56.0 |
| ZnO | 3.2 | 3.0 | 2.0 |  |  |
| NH₄Cl |  |  | 63.0 | 9.0 | 20.0 |
|  | 100.0 | 100.0 | 100.0 | 100.0 | 100.0 |

*Apparent analysis (per cent)*

|  | A | B | C | D | E |
|---|---|---|---|---|---|
| KCl | 35.0 | 37.0 | 35.0 | 91.0 | 15.0 |
| NaCl |  |  |  |  | 9.0 |
| NH₄Cl | 13.5 | 26.4 | 63.0 | 9.0 | 20.0 |
| ZnO | 3.2 | 3.0 | 2.0 |  |  |
| ZnCl₂ | 48.3 | 33.6 |  |  | 56.0 |
|  | 100.0 | 100.0 | 100.0 | 100.0 | 100.0 |

The ammonium chloride should be at least 9%.

In the foregoing examples the proportions are specified in parts by weight of the respective materials.

Formula A above has been found satisfactory for use for pipe or wire under a wide variety of conditions. It will be noticed that it contains about equal amounts of zinc ammonium chloride and zinc chloride.

Formula B is also satisfactory for general use but is ordinarily slightly more expensive, although it has the advantage of being completely non-hygroscopic. It contains no separate zinc chloride or ammonium chloride, but only the double salt.

Formula C is used where the flux on the articles to be galvanized deposits in the bath zinc chloride to such an extent that it is undesirable to add zinc chloride in the regenerative compound. Certain galvanizers make a practice of using saturated solutions of zinc chloride in the flux and in this case an excess of zinc chloride accumulates in the bath, making the use of zinc chloride in the regenerative compound undesirable.

Formula D is a regenerative compound suitable for use with an original blanket like my preferred composition which contains KCl 35, ZnCl₂ 59.3, NH₄Cl 4.6 and ZnO 1.1 and is for use where the flux employed consists of the common zinc ammonium chloride known as galvanizer's crystals and which has 1 mol of zinc chloride and 3 mols of ammonium chloride.

Formula E is for use with an original blanket made in accordance with Example IV above.

In describing my invention and in the claims, I have referred to zinc chloride and ammonium chloride, treating them as if they were always separate substances. It will be understood, however, that the two separate salts may be replaced with proper quantities of the double salts (zinc ammonium chlorides).

Although sodium and lithium chloride may be used in place of potassium chloride, I prefer to use potassium chloride because lithium chloride is too expensive and the crystals of sodium chloride decrepitate prior to fusion causing sputtering in the blanket, while potassium chloride melts quietly without sputtering.

I claim:

1. A blanket forming compound initially fusible upon molten zinc baths which comprises potassium chloride about 35 percent, ammonium chloride about 4.6 percent, zinc oxide about 1.1 percent, and zinc chloride about 59.3 percent.

2. A blanket forming compound initially fusible upon molten zinc baths which comprises ammonium chloride 4.6 to 20 percent, zinc oxide 1.1 to 15 percent, and the balance essentially alkali metal chloride and zinc chloride in proportions between 15:85 and 45:55, and the ammonium chloride being in excess of the zinc oxide.

3. A regenerating compound for fusible blankets for molten zinc baths, which blankets are composed initially and essentially of potassium chloride, zinc chloride and ammonium chloride, said regenerating compound consisting of ammonium chloride at least 9 percent and not more than 60% and the balance essentially alkali metal chloride.

4. A regenerating compound for fusible blankets for molten zinc baths, which blankets are composed initially and essentially of potassium chloride, zinc chloride and ammonium chloride, said regenerating compound consisting of ammonium chloride at least 9 percent and not more than 60% and the balance essentially alkali metal chloride and zinc chloride.

5. In the method of protecting the surface of molten zinc in the galvanizing of metal the steps which comprise adding a dry mix consisting essentially of alkali metal chloride, zinc chloride, ammonium chloride and a small amount of zinc oxide, the proportions of ammonium chloride, zinc chloride and alkali metal chloride being such as to produce a fusion blanket on the surface of the molten zinc, and the proportions of alkali metal chloride to zinc chloride in the mix being such as to maintain the fluidity of the blanket after the exhaustion of the ammonium chloride, and maintaining the fluidity of the blanket by the periodic addition of a composition consisting essentially of at least 9 percent of ammonium chloride and the balance alkali metal chloride.

6. In the method of protecting the surface of molten zinc in the galvanizing of metal, the steps which comprise adding a dry mix of ammonium chloride 4.6 to 20 percent, zinc oxide 1.1 to 15 percent, and the balance essentially alkali metal chloride and zinc chloride in the proportions between 15:85 and 45:55, which mix forms a liquid fusion blanket on the surface of the molten zinc, and maintaining the fluidity of the blanket by the periodic addition of a composition consisting essentially of at least 9 percent of ammonium chloride and the balance alkali metal chloride and zinc chloride.

DUNBAR L. SHANKLIN.

REFERENCES CITED

The following references are of record in the file of this patent:

UNITED STATES PATENTS

| Number | Name | Date |
|---|---|---|
| 92,998 | Peake | July 27, 1869 |
| 1,293,823 | Luckey | Feb. 11, 1912 |
| 1,560,933 | Emura | Nov. 10, 1925 |
| 1,914,269 | Liban | June 13, 1933 |
| 2,012,809 | Derick | Aug. 27, 1935 |

OTHER REFERENCES

1939 Metals Handbook, Amer. Soc. for Metals, Cleveland, page 1206.

International Critical Tables, National Research Council, published 1928 by McGraw-Hill Book Co., New York, vol. IV, page 45.